(12) United States Patent
Yanushevsky (10) Patent No.: US 7,185,844 B2
(45) Date of Patent: Mar. 6, 2007

(54) METHODS AND SYSTEMS FOR GUIDING AN OBJECT TO A TARGET USING AN IMPROVED GUIDANCE LAW

(75) Inventor: Rafael T. Yanushevsky, Bethesda, MD (US)

(73) Assignee: Technology Service Corporation, Silver Spring, MD (US)

( * ) Notice: Subject to any disclaimer, the term of this patent is extended or adjusted under 35 U.S.C. 154(b) by 50 days.

(21) Appl. No.: 10/834,830

(22) Filed: Apr. 30, 2004

(65) Prior Publication Data

US 2005/0242242 A1    Nov. 3, 2005

(51) Int. Cl.
*B64C 13/16* (2006.01)

(52) U.S. Cl. ....................... 244/3.15; 244/195; 701/21; 342/62

(58) Field of Classification Search ................ 244/194, 244/195, 3.15, 3.22; 701/21, 302; 342/62
See application file for complete search history.

(56) References Cited

U.S. PATENT DOCUMENTS

| | | | |
|---|---|---|---|
| 3,951,358 A | | 4/1976 | DeLano et al. ............ 244/3.15 |
| 3,984,068 A | | 10/1976 | McPhee .................... 244/3.19 |
| 4,494,202 A | * | 1/1985 | Yueh ......................... 701/302 |
| 4,502,650 A | | 3/1985 | Yueh ......................... 244/3.15 |
| 4,568,040 A | * | 2/1986 | Metz ......................... 244/3.22 |
| 5,193,766 A | * | 3/1993 | Kawano et al. ............ 244/161 |
| 5,253,823 A | * | 10/1993 | Lawrence .................. 244/3.15 |
| 5,319,556 A | * | 6/1994 | Bessacini .................... 701/21 |
| 5,429,322 A | | 7/1995 | Waymeyer .................. 244/3.15 |
| 5,435,503 A | | 7/1995 | Johnson, Jr. et al. ...... 244/3.15 |
| 5,975,460 A | | 11/1999 | Elkanick et al. ........... 244/3.15 |
| 6,064,332 A | * | 5/2000 | Cloutier ...................... 342/62 |
| 6,244,536 B1 | | 6/2001 | Cloutier .................... 244/3.19 |
| H1980 H | | 8/2001 | Cloutier ...................... 342/62 |
| 6,421,116 B1 | * | 7/2002 | Schilli et al. ................ 356/28 |
| 6,488,231 B1 | | 12/2002 | Schoffl ...................... 244/3.14 |

(Continued)

OTHER PUBLICATIONS

Debasish Ghose, "True Porportional Navigation with Maneuvering Target," *IEEE Transactions on Aerospace and Electronic Systems*, vol. 30, No. 1, Jan. 1994, pp. 229-237.

(Continued)

*Primary Examiner*—Galen Barefoot
(74) *Attorney, Agent, or Firm*—Finnegan, Henderson, Henderson, Farabow, Garrett & Dunner, LLP (57) ABSTRACT

Systems and methods for guiding an object may comprise improved guidance laws that improve the effectiveness of the PRONAV guidance law. The improved guidance laws may utilize the same parameters as the PRONAV law and may be algorithmically simpler than conventional guidance laws because they may not be based on information about an intercept point or time-to-go. The improved guidance laws may be developed based on the Lyapunov method. The improved guidance laws may augment the PRONAV law and may provide additional components based on the negative definiteness of the derivative of the Lyapunov function. The additional components may be determined based on the partial stability of the guidance system dynamics under consideration with respect to the line of sight derivative. A comparative analysis of the improved guidance laws with the PRONAV laws, for example, may show that the improved guidance laws guarantee shorter homing time requirements and larger capture areas. The object may comprise a tactical or strategic weapon, including, for example, a guided missile.

38 Claims, 6 Drawing Sheets

U.S. PATENT DOCUMENTS 6,845,938 B2 * 1/2005 Muravez ................... 244/3.11

OTHER PUBLICATIONS

Di Zhou, Chundi Mu, and Wenli Xu, "Adaptive Sliding-Mode Guidance of a Homing Missile," *Journal of Guidance, Control, Dynamics*, vol. 22, No. 4, Jul.-Aug. 1999, pp. 589-594.

Ilan Rusnak, "Optimal Guidance Laws with Uncertain Time-of-Flight Against Maneuvering Target and Noisy Measurements," *A/AA Guidance, Navigation, and Control Conference and Exhibit*, Aug. 11-14, 2003, Austin, Texas, Doc. No. A/AA 2003-5576.

In-Joong Ha, "A Lyapunov-Like Approach to Performance Analysis of 3-Dimensional Pure PNG Laws," *IEEE Transactions on Aerospace and Electronic Systems*, vol. 30, No. 1, 1994, pp. 238-247.

Jongki Moon, Kiseok Kim, and Youdan Kim, "Design of Missile Guidance Law Via Variable Structure Control," *Journal of Guidance, Control, and Dynamics*, vol. 24, No. 4, Jul.-Aug. 2001, pp. 659-664.

Joseph Z. Ben-Asher and Isaac Yaesh, "Optimal Guidance and Reduced Sensitivity to Time-to-Go Estimation Errors," *Journal of Guidance, Control, and Dynamics*, vol. 20, No. 1, Jan.-Feb. 1997, pp. 158-163.

K. Ravindra Babu, I.G. Sarma, and K.N. Swamy, "Switched Bias Proportional Navigation for Homing Guidance Against Highly Maneuvering Targets," *Journal of Guidance, Control, and Dynamics*, vol. 17, No. 6, Nov.-Dec. 1994, pp. 1357-1363.

Ki Baek Kim, Myung-Joon, Kim, and Wook Hyun Kwon, "Receding Horizon Guidance Laws with No Information on the Time-to-Go," *Journal of Guidance, Control, and Dynamics*, vol. 23, No. 2, Mar.-Apr. 2000, pp. 193-199.

Mauricio Guelman, "A Qualitative Study of Proportional Navigation," *IEEE Transactions on Aerospace and Electronic Systems*, vol. AES-7, No. 4, Jul. 1971, pp. 637-643.

Mauricio Guelman, "Missile Acceleration in Proportional Navigation," *IEEE Transactions oon Aerospace and Electronic Systems*, vol. 9, No. 3, 1973, pp. 462-463.

Mauricio Guelman, "Proportional Navigation with a Maneuvering Target," *IEEE Transactions on Aerospace and Electronic Systems*, vol. 8, No. 3, 1972, pp. 364-371.

Mauricio Guelman, "The Closed-Form Solution of True Proportional Navigation," *IEEE Transactions on Aerospace and Electronic Systems*, vol. AES-12, No. 4, Jul. 1976, pp. 472-482.

Pini Gurfil, "Zero-Miss-Distance Guidance Law Based on Line-of-Sight Rate Measurement Only," *AIAA Guidance, Navigation, and Control Conference and Exhibit*, Aug. 6-9, 1001, Montreal, Canada, Doc. No. AIAA 2001-4277.

Pini Gurfil, Mario Jodorkovsky, and Moshe Guelman, "Neoclassical Guidance for Homing Missiles," *Journal of Guidance, Control, and Dynamics*, vol. 24, No. 3, May-Jun. 2001, pp. 452-459.

Rafael T. Yanushevsky and Warren J. Boord, "New Approach to Guidance Law Design," *Journal of Guidance, Control, and Dynamics*, vol. 27, No. 4, Jul.-Aug. 2004, pp. 1-5.

Thomas L. Vincent, Robert W. Morgan, "Guidance Against Maneuvering Targets Using Lyapunov Optimizing Feedback Control," *Proceedings of the American Control Conference*, Anchorage, AK, May 8-10, 2002, pp. 215-220.

* cited by examiner

METHODS AND SYSTEMS FOR GUIDING AN OBJECT TO A TARGET USING AN IMPROVED GUIDANCE LAW

BACKGROUND OF THE INVENTION

I. Field of the Invention

The present invention generally relates to providing systems and methods of guidance of an object and, in particular, to improvements in homing guidance. The present invention constitutes an improvement over prior known guidance laws. More particularly, the present invention relates to providing systems and method that use improved guidance laws that are an improvement over the proportional navigation guidance laws (PRONAV).

II. Background Information

Various methods and systems of missile guidance and missile homing guidance are known prior to the present invention. The approach that has come to dominate missile guidance research and development is known as Proportional Navigation (PN). PN was developed by C. Yuan at RCA Laboratories during World War II based on physical intuition. This guidance law states that a commanded acceleration is proportional to a line of sight (LOS) rate. A proportionality constant, associating the commanded acceleration and the LOS rate, can be broken down into the product of an effective navigation ratio times a relative missile-target closing velocity.

Two decades later, a quasi-optimality of PN was derived. The prefix "quasi" means that PN was obtained as a linear quadratic optimal solution under the following assumptions:

(i) the target has zero acceleration;
(ii) the object (a missile for example) has perfect response and complete control of its acceleration vector;
(iii) the object is launched on a near collision course, so that LOS angles are small; and
(iv) the object has zero acceleration along the LOS over all time.

One or more of these assumptions, however, is not applicable in all situations.

In order to remove assumption (i), an additional term may be added to the basic PN law that is equal to the target's estimated acceleration normal to the LOS multiplied by a proportionality gain. Thus, the so-called Augmented Proportional Navigation (APN) law was developed. In order to remove assumption (iv), the PN law was presented with respect to a new parameter: time-to-go.

Guidance laws based on optimal control and game theory approaches have been proposed in the literature. These guidance laws, however, have not been implemented in practice. Guidance laws developed using the optimal control and game theory approaches are generally able to more effectively counteract target maneuvers than the ordinary PN law; however, they assume that a maneuvering target's trajectory, as well as time-to-go and intercept point are known. In practice, such information is not known and can only be evaluated approximately. The prediction accuracy of these approximations influence significantly the intercept accuracy. Moreover, optimal guidance laws obtained for the first-order models of flight control systems and applied for the third-order models, which are closer to reality, may give even worse results than the PN law.

Guidance laws developed using the game and control theory approaches analyze and offer additional improvements over PN and APN by using additional information or improving the quality of existing guidance channel information, without changing the guidance law structure, i.e., they all belong to the class of PN guidance laws (PRONAV). Prior to the present invention, PRONAV has continued to dominate research and development activity with respect to guidance laws. Because PRONAV implements parallel navigation, which is defined by the rule $\dot{\lambda}(t)=0$ for the planar LOS guidance (with an additional requirement $\dot{r}(t)<0$, where $\lambda(t)$ is a LOS angle with respect to the reference axis and $r(t)$ represents the target-to-missile range) or $\dot{\lambda}_s(t)=0$, $s=1,2,3$, for the three-dimensional case (where $\lambda_s(t)$ are LOS coordinates), a more general problem can be formulated to describe a class of improved guidance laws that will implement parallel navigation.

Prior known PN guidance laws (PRONAV), originated from proportional navigation which is based on an intuitive approach, give insufficient accuracy in many practical cases, especially for maneuvering targets. Thus, there remains a need for systems and methods that use improved guidance laws. In addition, there remains a need for systems and methods that improve upon the prior known PN guidance laws. Specifically, there remains a need for guidance laws that guarantee shorter time-t-go requirements and larger capture areas.

SUMMARY OF THE INVENTION

Consistent with embodiments of the present invention, systems and methods are disclosed for guiding an object.

In accordance with one embodiment, an improved method for guiding an object comprises controlling the object's movement using a guidance law, the guidance law belonging to the PRONAV class comprising an additional term for improving the accuracy of navigation relative to the PRONAV class of guidance laws.

In accordance with another embodiment, a method for guiding an object to a target comprises controlling said object's movement to said target using the following guidance law:

$$u_s = Nv_{cl}\dot{\lambda}_s + \sum_{k=1}^{3} u_{sk} \text{ where } \begin{array}{l} u_{s1}(t) = N_{1s}\dot{\lambda}_s^3(t), \quad N_{1s} > 0 \\ u_{s2}(t) = N_{2s}\lambda_s(t)\dot{r}(t) \end{array}$$

$$N_{2s} \begin{array}{c} \geq 1 \\ \leq 1 \end{array} \text{ if } \text{sign}(\dot{r}(t)\dot{\lambda}_s(t)\lambda_s(t)) \begin{array}{c} \leq 0 \\ \geq 0 \end{array}$$

$$u_{s3}(t) = N_{3s}a_{Ts}(t)$$

$$N_{3s} \begin{array}{c} \leq 1 \\ \geq 1 \end{array} \text{ if } \text{sign}(a_{Ts}(t)\dot{\lambda}_s(t)) \begin{array}{c} \leq 0 \\ \geq 0 \end{array}$$

In accordance with yet another embodiment, a system for guiding an object to a target comprises a sensor unit configured to sense said target and to provide one or more sensor data corresponding to said target, an estimation unit configured to provide estimation data based on at least one or more of said one or more sensor data, a guidance unit configured to calculate guidance data based at least on said estimation data, said guidance unit being configured to calculate said guidance data using at least a PRONAV guidance law and an additional term, and a flight control unit configured to provide a control signal, said control signal being based at least on said guidance data and being configured to control said object's movement to said target.

In accordance with yet another embodiment, a system for calculating guidance data configured to be used in guiding an object to a target comprises a component configured to calculate said guidance data using at least a PRONAV guidance law and an additional term.

In accordance with yet another embodiment, a system for guiding an object to a target comprises a component configured to provide a control signal, said control signal being based at least on guidance data and being configured to control said object's movement to said target, said guidance data being calculated using at least a PRONAV guidance law and an additional term in addition to said guidance law.

In accordance with yet another embodiment, a computer-readable medium comprises a set of instructions which when executed perform a method for guiding an object, the method comprising controlling said object's movement using a guidance law, said guidance law belonging to the PRONAV class comprising an additional term for improving the accuracy of navigation relative to the PRONAV class of guidance laws.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate at least one embodiment and aspect of the present invention.

DETAILED DESCRIPTION

The following detailed description refers to the accompanying drawings. Wherever possible, the same reference numbers are used in the drawings and the following description to refer to the same or similar parts. While certain embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention comprise improved guidance laws that may improve the effectiveness of the prior known PRONAV guidance laws, for example. Regarding embodiments of the present invention, PRONAV may be used to describe a class of known guidance laws. For example, PRONAV guidance laws may include, but are not limited to, Proportional Navigation (PN) guidance laws and Augmented Proportional Navigation (APN) guidance laws. The aforementioned guidance laws are exemplary and other may comprise the PRONAV guidance laws. The improved guidance laws may be algorithmically simpler than known guidance laws because, for example, they may not be based on information about the intercept point and/or time-to-go. The improved guidance laws may be based on the Lyapunov method, and may include additional components based on the Lyapunov function's derivative's negative definiteness. The improved guidance law may be based on the partial stability of the guidance system dynamics under consideration with respect to the LOS derivative. Furthermore, the improved guidance laws may provide shorter homing times, a larger capture area, and may be used for maneuvering or non-maneuvering targets.

The improved guidance laws may be obtained as the solution of a stability problem using the Lyapunov function. The Lyapunov function may be chosen as a square of the LOS derivative for the planar case or the sum of squares of LOS derivative components for the three-dimensional case. Moreover, the improved guidance laws may be determined by the negative definiteness of the derivative of the Lyapunov function. Furthermore, the module of the Lyapunov function derivative along the engagement system's trajectory can be used as a performance index for improved guidance laws. Also, the improved guidance laws may be determined based on the system under consideration dynamics' partial stability with respect to the LOS derivative. Moreover, the improved guidance law may implement parallel navigation which is defined by the rule $\dot{\lambda}(t)=0$ for the planar case (where $\lambda(t)$ is a LOS angle with respect to the reference axis) or $\dot{\lambda}_s(t)=0$, s=1,2,3, for the three-dimensional case (where $\lambda_s(t)$, s=1,2,3, are LOS coordinates).

Figure 1:
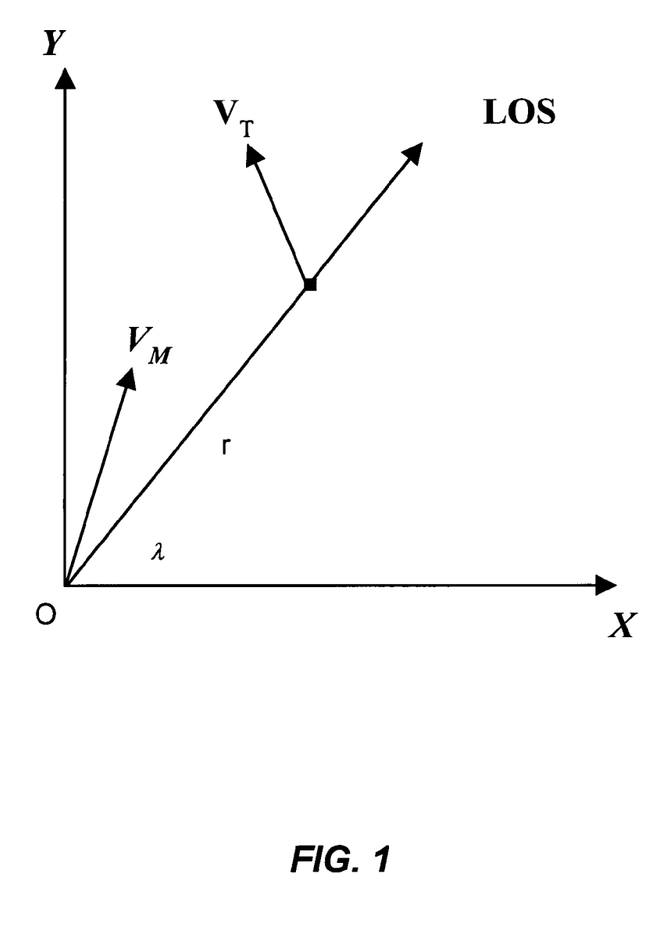
FIG. 1 illustrates planar engagement geometry using a Cartesian frame of coordinates consistent with an embodiment of the present invention.
Figure 2:
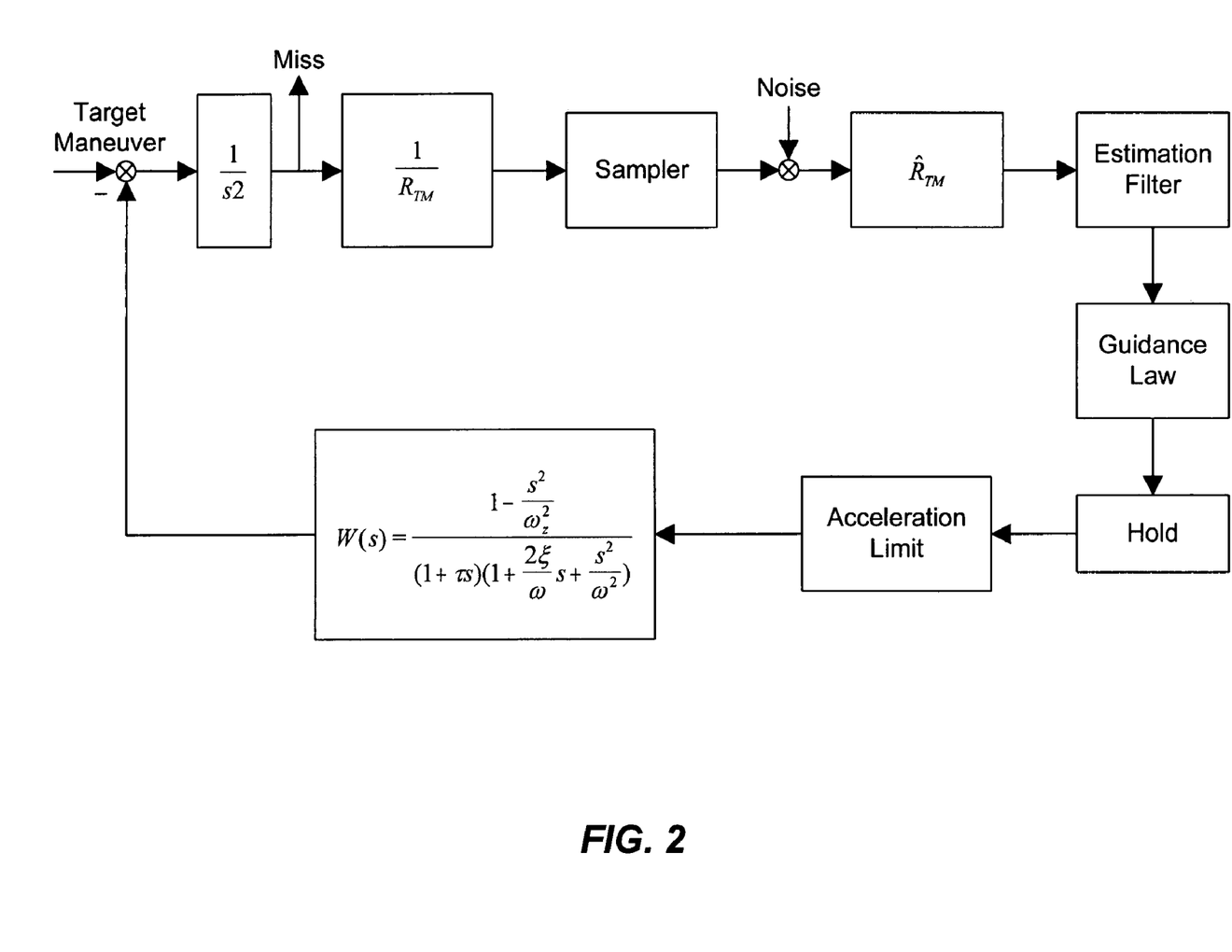
FIG. 2 is a block diagram of an exemplary system consistent with an embodiment of the present invention.

FIG. 1 illustrates engagement geometry for the planar case using a Cartesian frame of coordinates (FOC) with an inertial reference coordinate system's origin. FIG. 2 shows the planar guidance system model. y(t) is the relative separation, for example, between a missile and a target perpendicular to the X reference axis. $V_M$, $a_M$, and $V_T$, and $a_T$ are the missile and target velocity and acceleration, respectively.

Using a small angle approximation, the expressions for the LOS angle and its derivatives for the planar case may be presented in the following form:

$$\lambda(t) = \frac{y(t)}{r(t)} \tag{1}$$

$$\ddot{\lambda} = -a_1(t)\lambda(t) - a_2(t)\dot{\lambda}(t) + b_1\ddot{y}(t) \text{ where} \tag{2}$$

$$a_1(t) = \frac{\ddot{r}(t)}{r(t)} \tag{3}$$

$$a_2(t) = \frac{2\dot{r}(t)}{r(t)} \tag{4}$$

$$b(t) = \frac{1}{r(t)} \tag{5}$$

$$\ddot{y}(t) = -a_M(t) + a_T(t) \tag{6}$$

If $x_1=\lambda(t)$ and $x_2=\dot{\lambda}(t)$, the following first order differential equation system may describe, for example, the missile-target engagement:

$$\dot{x}_1 = x_2 \quad (5)$$

$$\dot{x}_2 = -a_1(t)x_1 - a_2(t)x_2 - b(t)u + b(t)f \quad (7)$$

where the control $u=a_M(t)$ and disturbance $f=a_T(t)$.

The guidance problem may be formulated as choosing control u to guarantee asymptotic stability of (7) with respect to $x_2$. For a non-accelerating target, $f=0$.

For the Lyapunov function, $$Q = \frac{1}{2}cx_2^2 \quad (8)$$

where c is a positive coefficient, its derivative along any trajectory of (7), when $f=0$, equals $$\dot{Q} = cx_2(-a_1(t)x_1 - a_2(t)x_2 - b(t)u) \quad (9)$$

Under the near collision course assumption, $\ddot{r}(t)=0$, $a_1(t)=0$, and the control law that guarantees the negative definiteness of (9), i.e., the asymptotic stability of system (7) with respect to $x_2$ can be presented in the form:

$$u = kx_2, \quad kb(t) + a_2(t) > 0 \text{ or } k > -\frac{a_2(t)}{b(t)} \quad (10)$$

Introducing the closing velocity $v_{cl} = -\dot{r}(t)$ and the effective navigation ratio N, the expression (10) can be rewritten as $k > 2 v_{cl}$, and the guidance law can be presented as:

$$u = Nv_{cl}\dot{\lambda}, \quad N>2 \quad (11)$$

Equation (11) shows that the present invention may yield the prior known PN guidance law when analyzed under the assumptions under which the prior known laws are used. Because proportional navigation may implement parallel navigation ($\dot{\lambda}(t)=0$), the laws belonging to the PN class may be compared by their closeness to parallel navigation.

The module of the Lyapunov function derivative $|\dot{Q}(t)|$ (9) may comprise the performance index for comparing the PN guidance laws to the improved guidance law.

It may be assumed, for example, that there exists a capture range domain over which the control (guidance law) u(t) (11) may guarantee engagement ($x_2(t) \to 0$). Accordingly, the following improved guidance law may provide better performance than the prior known PN guidance law (11):

$$u = Nv_{cl}\dot{\lambda}(t) + N_1\dot{\lambda}^3(t), \quad N>2, N_1>0 \quad (12)$$

Using the negative definiteness of the derivative of the Lyapunov function (8) in the case of a maneuvering target ($f \neq 0$)

$$\dot{Q} = cx_2(-a_1(t)x_1 - a_2(t)x_2 - b(t)u + b(t)f) \quad (13)$$

The negative definiteness of (13) may be established for $a_1(t) \neq 0$ and $a_2(t) \leq 0$ if the control u is as follows:

$$u = Nv_{cl}\dot{\lambda}(t) + N_1\dot{\lambda}^3(t) - N_2\lambda(t)\ddot{r}(t) + N_3 a_T(t) \quad (14)$$

$$N > 2, N_1 > 0,$$

$$N_2 \begin{array}{c} \geq 1 \\ \leq 1 \end{array} \text{ if } \text{sign}(\ddot{r}(t)\dot{\lambda}(t)\lambda(t)) \begin{array}{c} \leq 0 \\ \geq 0 \end{array}$$

$$N_3 \begin{array}{c} \leq 1 \\ \geq 1 \end{array} \text{ if } \text{sign}(a_T(t)\dot{\lambda}(t)) \begin{array}{c} \leq 0 \\ \geq 0 \end{array}$$

The improved guidance law (14) may be presented as the sum of the PN guidance law and additional correcting controls, as follows:

$$u = Nv_{cl}\dot{\lambda} + \sum_{k=1}^{3} u_k \quad (15)$$

where $$u_1(t) = N_1\dot{\lambda}^3(t), \quad N_1 > 0 \quad (16)$$

$$u_2(t) = N_2\lambda(t)\ddot{r}(t) \quad (17)$$

$$u_3(t) = N_3 a_T(t) \quad (18)$$

Each of the controls $u_k$ (k=1,2,3) may increase the effectiveness of the improved navigation law with respect to the criterion chosen. The number controls applied in practice may depend on the problem under consideration, for example, target distances, LOS angles, maneuvering or non-maneuvering targets, as well as the systems ability to realize the correction control in practice.

The coefficients $N_1$ through $N_3$ may be determined based on simulation results of the whole system taking into account, for example, the autopilot limits on a missile acceleration, airframe dynamics, and other factors. That is the coefficients may be determined in the same way as the most appropriate values N=3-4 were established for the PN laws.

The three-dimensional case may be considered analogous to the planar case (see R. Yanushevsky, "*New Multidimensional Midcourse and Homing Guidance Laws and Their Comparison with the PN and Kappa Guidance Laws*," TSC-W242-001/rty, June 2003.)

Embodiments of the present invention may be used in all phases of guiding an object, for example, to a target. For example, embodiments consistent with the invention may be used during, a boost phase, a mid-course phase, a homing phase, an intercept, a rendezvous phase, and during general battlefield guidance. Furthermore, embodiments consistent with the invention may be used in navigation comprising two (2) dimensions (planar case), three (3) dimensions; step and weaving maneuvers, homing and mid-course guidance.

An embodiment consistent with the invention may comprise a system for guiding an object to a target system. The target may be moving or non-moving. The object may comprise, for example, a tactical or strategic weapon, including for example, a guided missile. The aforementioned are exemplary, and the object may comprise any element capable of being guided to a target. The system may comprise a sensor unit, estimation unit, guidance unit, and control unit. The system, for example, may be operative to control the object's movement to the target using the following guidance law:

$$u_s = N v_{cl} \dot{\lambda}_s + \sum_{k=1}^{3} u_{sk} \text{ where } \begin{aligned} u_{s1}(t) &= N_{1s} \dot{\lambda}_s^3(t), \quad N_{1s} > 0 \\ u_{s2}(t) &= N_{2s} \lambda_s(t) \ddot{r}(t) \end{aligned}$$

$$N_{2s} \begin{matrix} \geq 1 \\ \leq 1 \end{matrix} \text{ if } \text{sign}(\ddot{r}(t)\dot{\lambda}_s(t)\lambda_s(t)) \begin{matrix} \leq 0 \\ \geq 0 \end{matrix}$$

$$u_{s3}(t) = N_{3s} a_{Ts}(t)$$

$$N_{3s} \begin{matrix} \leq 1 \\ \geq 1 \end{matrix} \text{ if } \text{sign}(a_{Ts}(t)\dot{\lambda}_s(t)) \begin{matrix} \leq 0 \\ \geq 0 \end{matrix}$$

An improved method for guiding an object may comprise controlling an object's movement using a guidance law. The guidance law may belong to the PRONAV class and including an additional term (terms) for improving the accuracy of navigation relative to the PRONAV class of guidance laws. The additional term may be characterizable by the term $u_{s1}(t) = N_{1s} \dot{\lambda}_s^3(t)$, $N_{1s} > 0$ for increasing the effectiveness of the PRONAV guidance law for large line of sight (LOS) rates (it may have a small effect for small line of sight (LOS) rates). Moreover, the aforementioned method may further comprise calculating a closing velocity for the object and estimating a derivative of the closing velocity. The additional term may comprise a shaping component for influencing the terminal velocity of the object. The shaping component may be characterizable by the term $$u_{s2}(t) = N_{2s}\lambda_s(t)\ddot{r}(t) \text{ where } N_{2s} \begin{matrix} \geq 1 \\ \leq 1 \end{matrix} \text{ if } \text{sign}(\ddot{r}(t)\dot{\lambda}_s(t)\lambda_s(t)) \begin{matrix} \leq 0 \\ \geq 0 \end{matrix}.$$

Furthermore, the aforementioned method may further include the additional term being sensitive to $\text{sign}(a_{Ts}(t)\dot{\lambda}_s(t))$ for increasing the effectiveness of the guidance law and being characterizable by the term $$u_{s3}(t) = N_{3s} a_{Ts}(t) \text{ where } N_{3s} \begin{matrix} \leq 1 \\ \geq 1 \end{matrix} \text{ if } \text{sign}(a_{Ts}(t)\dot{\lambda}_s(t)) \begin{matrix} \leq 0 \\ \geq 0 \end{matrix}.$$

The "cubic" term $u_{s1}(t) = N_{1s}\dot{\lambda}_s^3(t)$, for example, with a properly chosen gain $N_{1s}$, may increase the effectiveness of the PN guidance law for relatively large LOS rates and may have an insignificant effect for small LOS rates. The "cubic" term may not require any additional measurements compared, for example, to the PN guidance law. The "cubic" term may work with the PN law, for example, with or without other additional terms.

The term $u_{s2}(t) = N_{2s}\lambda_s(t)\ddot{r}(t)$ may work as a shaping component and may influences an object's terminal velocity. This term may require the measurement of the closing velocity and an estimate of its derivative. Closing velocity may not be a fast changing parameter and the measurement of its derivative may be easily estimated in practice. This term can work, for example, with the PN guidance law, with or without other additional terms.

In addition, the term $u_{s3}(t) = N_{3s}a_{Ts}(t)$ may be distinguished from the APN law term by the value of its gain, which may depend upon $\text{sign}(a_{Ts}(t)\dot{\lambda}_s(t))$. This term can work with, for example, the PN guidance law with or without other additional terms.

Figure 3:
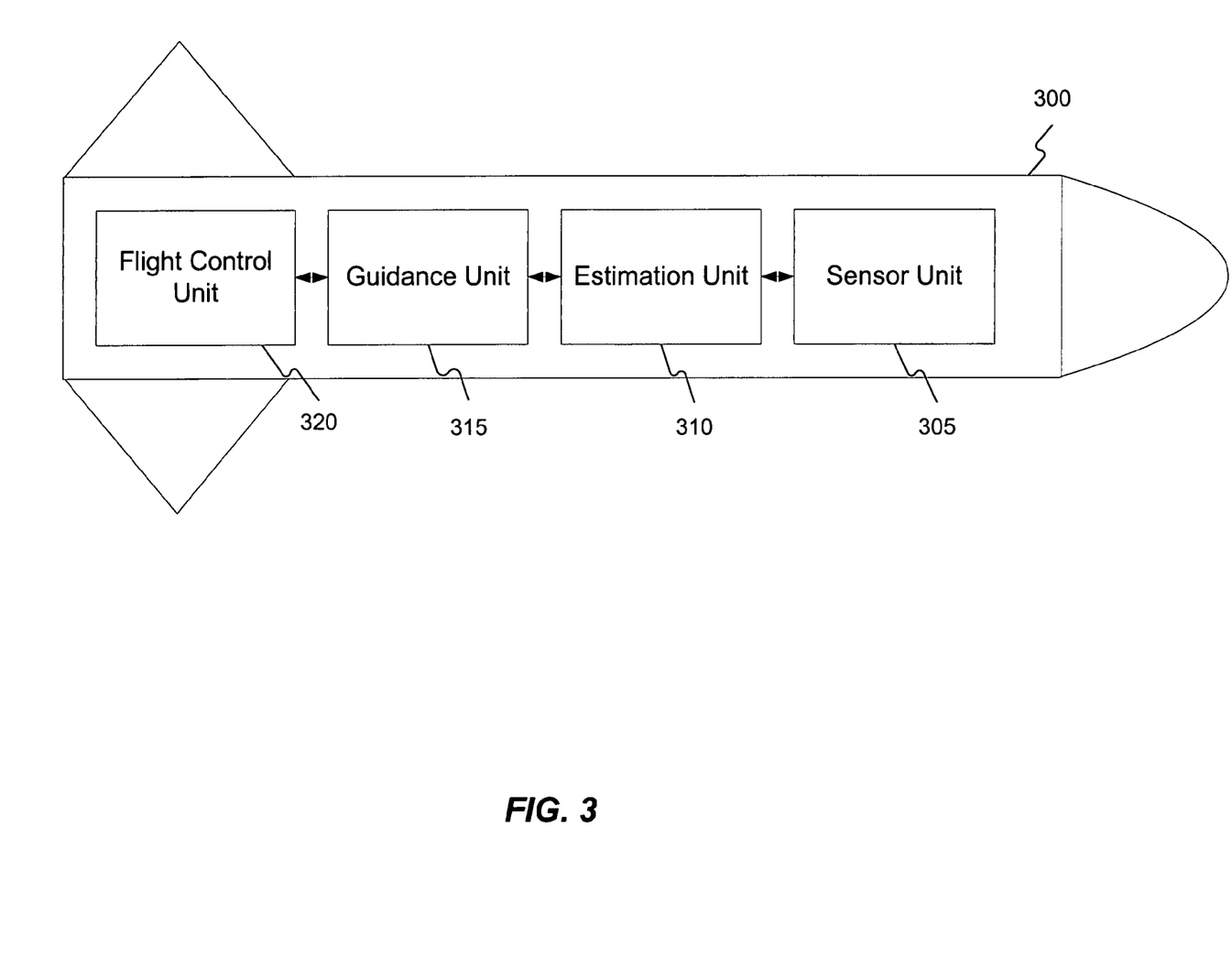
FIG. 3 is a block diagram of another exemplary system consistent with an embodiment of the present invention.

By way of a non-limiting example, FIG. 3 illustrates a system in which the features and principles of the present invention may be implemented. As illustrated in the block diagram of FIG. 3, the system, implemented within a missile 300, may include a sensor unit 305, an estimation unit 310, a guidance unit 315, and a flight control unit 320.

The aforementioned units may comprise any suitable combination of hardware, software and/or firmware. Furthermore, the aforementioned units may be practiced in an electrical circuit comprising discrete electronic elements, packaged or integrated electronic chips containing logic gates, a circuit utilizing a microprocessor, or on a single chip containing electronic elements or microprocessors. Moreover, the aforementioned units may be practiced using other technologies capable of performing logical operations such as, for example, AND, OR, and NOT, including but not limited to mechanical, optical, fluidic, and quantum technologies. In addition, the aforementioned units may be practiced within a general purpose computer or in any other circuits or systems.

Sensor unit 305 may comprise a sensor unit configured to sense the target and to provide one or more sensor data corresponding to the target. The one or more sensor data may comprise one or more of line of sight rate, closing velocity, relative range, relative range rate, and target acceleration. The aforementioned sensor data are exemplary and the sensor data may comprise other elements.

Estimation unit 310 may comprise an estimation unit configured to provide estimation data based on at least one or more of the one or more sensor data. The estimation data may comprise at least line of sight, line of sight rate, closing velocity rate, time-to-go, relative range, predicted intercept point, and target acceleration. The aforementioned estimation data are exemplary and the estimation data may comprise other elements.

Guidance unit 315 may comprise a guidance unit or component configured to calculate guidance data based at least on the estimation data. The guidance unit 315 may be configured to calculate the guidance data using at least a PRONAV guidance law and an additional term as described above. Flight control unit 320 may comprise a flight control unit or component configured to provide a control signal. The control signal may be based at least on the guidance data and may be configured to control the object's movement to the target.

Figure 4:
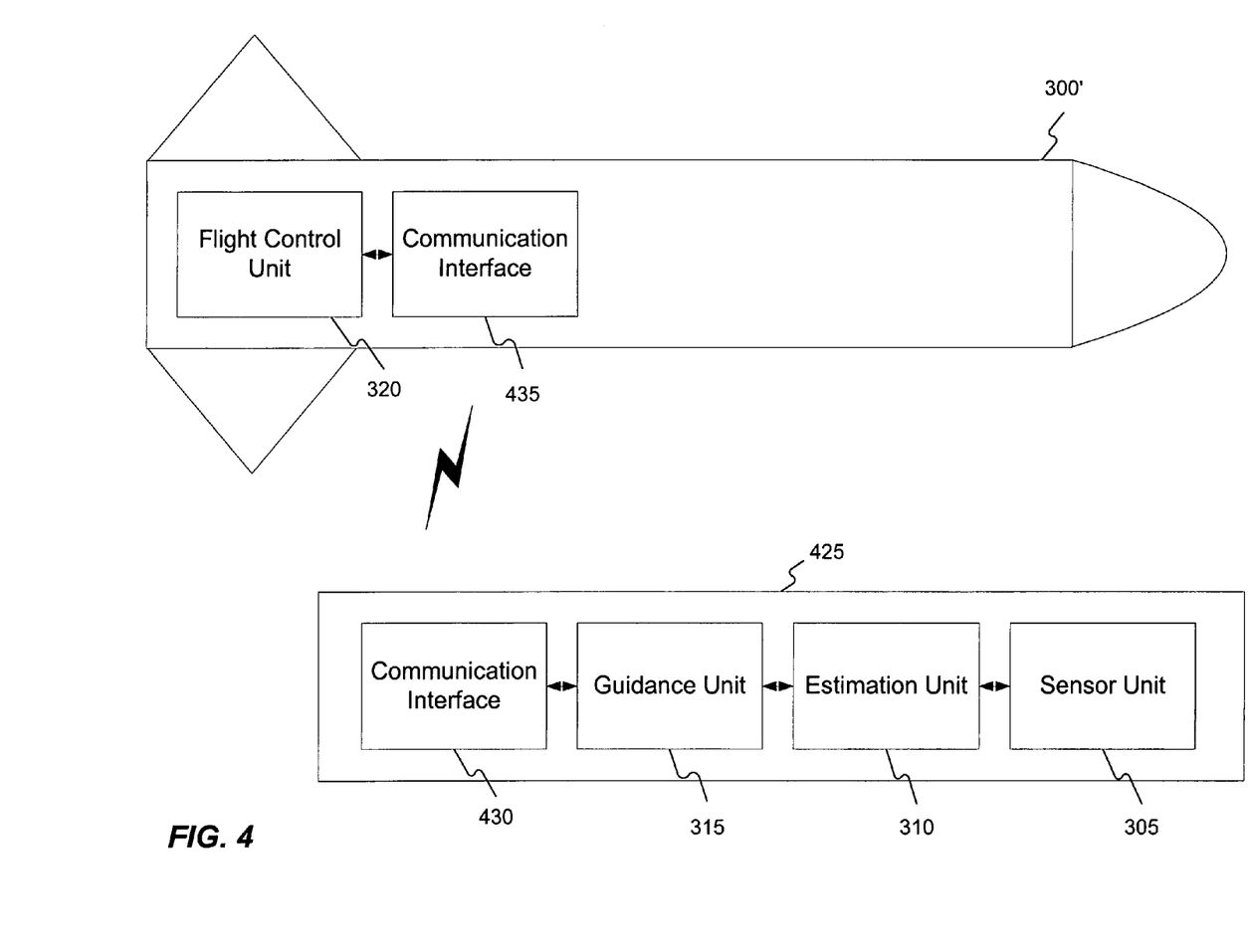
FIG. 4 is a block diagram of yet another system consistent with an embodiment of the present invention.

FIG. 4 is another embodiment consistent with the present invention. As shown in FIG. 4, sensor unit 305, estimation unit 310, and guidance unit 315 may be located remotely in location 425 from flight control unit 320 in a missile 300'. Notwithstanding, anyone or any ones of sensor unit 305, estimation unit 310, guidance unit 315, and flight control unit 320 may be located remotely from anyone or ones of the aforementioned units. Location 425 may comprise a ship, an airplane, a tank, a vehicle, an armored vehicle, or any location capable of containing anyone or ones of the aforementioned units.

Any unit or units located in location 425 may communicate via wire or wirelessly with any unit or units located in missile 300' via communication interfaces 430 and 435. Wireless can be defined as radio transmission via the airwaves. However, it may be appreciated that various other communication techniques can be used to provide wireless transmission, including infrared line of sight, cellular, microwave, satellite, packet radio, and spread spectrum radio. The aforementioned wireless techniques are exemplary and others may be used.

OPERATIONAL EXAMPLES

FIG. 2 shows a linearized planar missile guidance model used for the above operational examples as described, for example, in R. T. Yanushevsky, "*New Multidimensional Midcourse and Homing Guidance Laws and Their Comparison with the PN and Kappa Guidance Laws*," TSC-W242-001/rty, June 2003; R. T. Yanushevsky and W. J. Boord, "*A New Approach to Guidance Law Design*," AIAA Guidance, Navigation, and Control Conference, Austin, 2003, AIAA-2003-4770.

Here $R_{TM}$ is the range r between a missile and a target and $\hat{R}_{TM}$ is its estimate. The flight control dynamics is presented by a third order transfer function as follows with damping $\zeta$ and natural frequency $\omega$, the flight control system time constant $\tau$, and the right-half plane zero $\omega_z$:

$$W(s) = \frac{1 - \frac{s^2}{\omega_z^2}}{(1 + \tau s)\left(1 + \frac{2\xi}{\omega}s + \frac{s^2}{\omega^2}\right)}$$

Four guidance laws are considered: i) proportional navigation; ii) augmented proportional navigation; iii) nonlinear guidance as discussed above, without measurements of target acceleration; and iv) nonlinear guidance utilizing target acceleration measurements.

Figure 5:
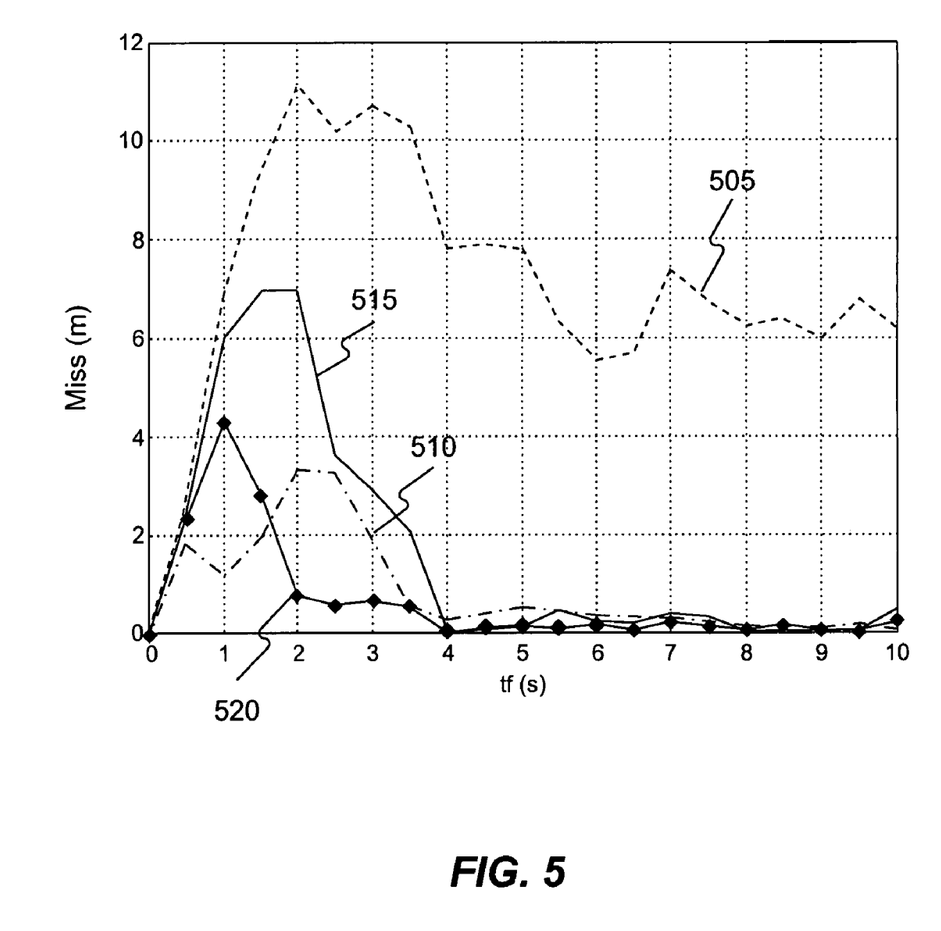
FIG. 5 illustrates the results of a Monte Carlo simulation for a step target maneuver consistent with an embodiment of the present invention.
Figure 6:
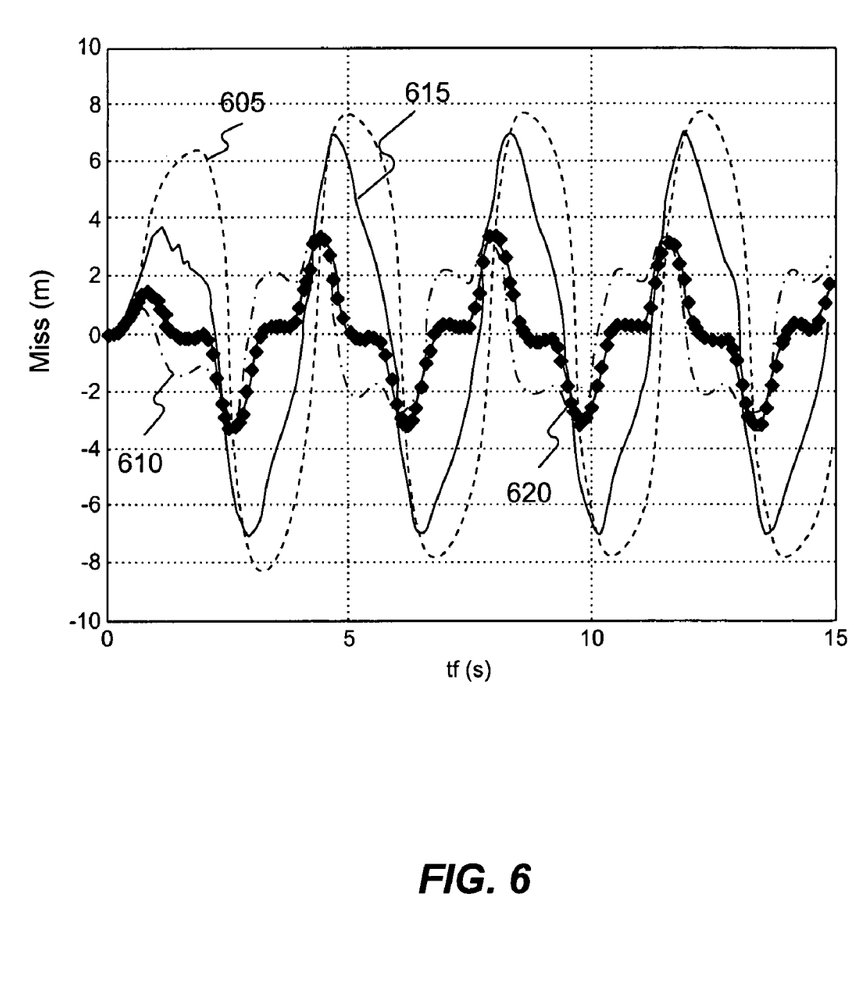
FIG. 6 illustrates the results of a Monte Carlo simulation for a weaving target maneuver consistent with an embodiment of the present invention.

The effectiveness of the invention may be demonstrated by operational examples in FIG. 5 and FIG. 6 (tf is time of flight), which present Monte-Carlo simulations using the planar model in FIG. 2 for the step (FIG. 5) and weaving (FIG. 6) target maneuvers, respectively. FIG. 5 corresponds to a 3 g step target maneuver with a 10 g acceleration limit for an intercept missile flight control system with time lag 1 s, natural frequency 20 r/s, damping 0.7, and the right-half plane zero 5 r/s. For the example in FIG. 5, the proportional navigation gain N equals 4 and the closing velocity is 1219.2 m/s.

FIG. 6 corresponds to a 8 g 'bang-bang' target commanded acceleration that characterizes a weaving maneuver with period about 3.6 s. The target dynamics are taken into consideration (the target flight control system parameters are: time lag 0.15 s, a natural frequency 2 r/s, a damping 0.8, and the right-half plane zero 15 r/s) so that the real target acceleration is the result of the transformation of the 'bang-bang' periodic signal with 8 g amplitude by the third order dynamic unit with the above mentioned parameters. The intercept missile flight control system has an acceleration limit 40 g, time lag 0.1 s, a natural frequency of 5 r/s, a damping 0.65, and the right-half plane zero 30 r/s. The proportional navigation gain N equals 3 and closing velocity is 7000 m/s.

FIG. 5 and FIG. 6 show the result of Monte-Carlo simulation (50 runs with a measurement noise standard deviation of 1 mr) for the flight time 10 s and 15 s, respectively. Dotted lines correspond to the PN law (lines 505 and 605 in FIG. 5 and FIG. 6 respectively.) Dash-dotted lines correspond to the APN law (lines 510 and 610 in FIG. 5 and FIG. 6 respectively.) Consistent with embodiments of the inventions, the solid lines (lines 515 and 615 in FIG. 5 and FIG. 6 respectively) reflect the influence of the "cubic" term with gain $N_1$=40000 $V_{cl}$. And the lines with asterisk (lines 520 and 620 in FIG. 5 and FIG. 6 respectively) reflect the influence of the "cubic" term and the target acceleration term with gain 0.5/1.25 and 1/1.75, respectively. Because here the closing velocity is constant, the shaping terms do not influence the result. As shown in FIG. 5 and FIG. 6, the influence of the "cubic" term and a target acceleration term, for example, may provide a vast improvement over the PN and APN guidance laws.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, hard disks, floppy disks, a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification be considered as exemplary only, with the true scope and spirit of the invention being indicated by the following claims and their full scope of equivalents.

What is claimed is:

1. An improved method for guiding an object, comprising controlling said object's movement using a parallel navigation guidance law comprising one or more terms determined based on a Lyapunov method for improving the accuracy of guidance relative to a PRONAV guidance law.

2. The method of claim 1, wherein said one or more terms determined based on the Lyapunov method are characterizable by the term $u_{s1}(t) = N_{1s}\dot{\lambda}^s_3(t)$, $N_{1s}>0$, for increasing the effectiveness of said PRONAV guidance law for large line of sight (LOS) rates and has a small effect for small line of sight (LOS) rates.

3. The method of claim 1, further comprising:
   determining a closing velocity for said object; and
   estimating a derivative of said closing velocity, said term determined based on the Lyapunov method comprising a shaping component for influencing the terminal velocity of said object, said shaping component being characterizable by the term $$u_{s2}(t) = N_{2s}\lambda_s(t)\dot{r}(t) \text{ where } N_{2s} \begin{array}{c} \geq 1 \\ \leq 1 \end{array} \text{ if sign}\left(\dot{r}(t)\lambda_s(t)\right) \begin{array}{c} \leq 0 \\ \geq 0 \end{array}.$$

4. The method of claim 1, wherein said one or more terms determined based on the Lyapunov method are sensitive to sign($a_{Ts}(t)\dot{\lambda}_s(t)$) for increasing the effectiveness of said guidance law and being characterizable by the term $$u_{s3}(t) = N_{3s}a_{Ts}(t) \text{ where } N_{3s} \begin{array}{c} \leq 1 \\ \geq 1 \end{array} \text{ if sign}\left(a_{Ts}(t)\dot{\lambda}_s(t)\right) \begin{array}{c} \leq 0 \\ \geq 0 \end{array}.$$

5. A method for guiding an object to a target, the method comprising:
   determining a guidance law based on the following algorithm $$u_s = N v_{cl} \dot{\lambda}_s + \sum_{k=1}^{3} u_{sk} \text{ where}$$

$$u_{s1}(t) = N_{1s} \dot{\lambda}_s^3(t), N_{1s} > 0$$

$$u_{s2}(t) = N_{2s} \lambda_s(t) \ddot{r}(t)$$

$$N_{2s} \begin{array}{c} \geq 1 \\ \leq 1 \end{array} \text{ if sign}(\ddot{r}(t)\lambda_s(t)\dot{\lambda}_s(t)) \begin{array}{c} \leq 0 \\ \geq 0 \end{array}$$

$$u_{s3}(t) = N_{3s} a_{Ts}(t)$$

$$N_{3s} \begin{array}{c} \leq 1 \\ \geq 1 \end{array} \text{ if sign}(a_{Ts}(t)\dot{\lambda}_s(t)) \begin{array}{c} \leq 0 \\ \geq 0 \end{array} ; \text{ and}$$

controlling the object's movement to the target based on the calculated guidance law.

6. The method of claim 5, further comprising selecting said $u_{s1}(t) = N_{1s} \dot{\lambda}_s^3(t)$ term wherein said term $N_{1s}$ is selected to increase the effectiveness of said guidance law for large relative line of sight rates and has a minimal effect for small line of sight rates, to provide a more accurate result in a proportional navigation law than if said $u_{s1}(t) = N_{1s} \dot{\lambda}_s^3(t)$ term is zero.

7. The method of claim 5, further comprising selecting said term $u_{s2}(t) = N_{2s} \lambda_s(t) \ddot{r}(t)$, wherein selecting said term $u_{s2}(t) = N_{2s} \lambda_s(t) \ddot{r}(t)$ further comprises:
measuring a closing velocity of said object; and
calculating a derivative of said measured closing velocity wherein the effectiveness of said guidance law provides a more accurate result in said proportional navigation law than if said $u_{s2}(t) = N_{2s} \lambda_s(t) \ddot{r}(t)$ term were zero.

8. The method of claim 7, wherein calculating said derivative of said measured closing velocity further comprises estimating said derivative of said measured closing velocity.

9. The method of claim 5, further comprising selecting said term $u_{s3}(t) = N_{3s} a_{Ts}(t)$, where $N_{3s}$ is a time-varying coefficient, comprising measuring an acceleration of said target to provide a more accurate result than the augmented proportional navigation law (APN) that does not contain sign($a_{Ts}(t)\dot{\lambda}_s(t)$).

10. The method of claim 9, further comprising calculating said target acceleration comprising estimating said measured target acceleration.

11. The method of claim 5, wherein said target is maneuvering.

12. The method of claim 5, wherein said target is non-maneuvering.

13. A system for guiding an object to a target, the system comprising:
a sensor unit configured to sense said target and to provide one or more sensor data corresponding to said target;
an estimation unit configured to provide estimation data based on at least one or more of said one or more sensor data;
a guidance unit configured to calculate guidance data based at least on said estimation data, said guidance unit being configured to calculate said guidance data using a parallel navigation guidance law and one or more terms determined based on a Lyapunov method; and
a flight control unit configured to provide a control signal, said control signal being based at least on said guidance data and being configured to control said object's movement to said target.

14. The system of claim 13, wherein said one or more sensor data comprises at least one of line of sight rate, closing velocity, relative range, relative range rate, and target acceleration.

15. The system of claim 13, wherein said estimation data comprises at least line of sight, line of sight rate, closing velocity rate, time-to-go, relative range, predicted intercept point, and target acceleration.

16. The system of claim 13, wherein said term comprises one of: a) a first term; b) a second term; c) a third term; d) a summation of two of said first term, said second term, and said third term; and e) a summation of said first term, said second term, and said third term, wherein:
said first term is characterizable by the following expression:

$$u_{s1}(t) = N_{1s} \dot{\lambda}_s^3(t), N_{1s} > 0,$$

said second term is characterizable by the following expression:

$$u_{s2}(t) = N_{2s} \lambda_s(t) \ddot{r}(t), \text{ where}$$

$$N_{2s} \begin{array}{c} \geq 1 \\ \leq 1 \end{array} \text{ if sign}(\ddot{r}(t)\lambda_s(t)\dot{\lambda}_s(t)) \begin{array}{c} \leq 0 \\ \geq 0 \end{array}, \text{ and}$$

said third term is characterizable by the following expression:

$$u_{s3}(t) = N_{3s} a_{Ts}(t), \text{ where } N_{3s} \begin{array}{c} \leq 1 \\ \geq 1 \end{array} \text{ if sign}(a_{Ts}(t)\dot{\lambda}_s(t)) \begin{array}{c} \leq 0 \\ \geq 0 \end{array}.$$

17. The system of claim 13, wherein said term comprises one or more terms selected from the group consisting of: a) a first term; b) a second term; and c) a third term, wherein:
said first term is characterizable by the following expression:

$$u_{s1}(t) = N_{1s} \dot{\lambda}_s^3(t), N_{1s} > 0,$$

said second term is characterizable by the following expression:

$$u_{s2}(t) = N_{2s} \lambda_s(t) \ddot{r}(t), \text{ where}$$

$$N_{2s} \begin{array}{c} \geq 1 \\ \leq 1 \end{array} \text{ if sign}(\ddot{r}(t)\lambda_s(t)\dot{\lambda}_s(t)) \begin{array}{c} \leq 0 \\ \geq 0 \end{array}, \text{ and}$$

said third term is characterizable by the following expression:

$$u_{s3}(t) = N_{3s} a_{Ts}(t), \text{ where } N_{3s} \begin{array}{c} \leq 1 \\ \geq 1 \end{array} \text{ if sign}(a_{Ts}(t)\dot{\lambda}_s(t)) \begin{array}{c} \leq 0 \\ \geq 0 \end{array}.$$

18. The system of claim 13, wherein any one or more of said sensor unit, said estimation unit, said guidance unit, and said flight control unit is located remote from said object.

19. A system for calculating guidance data configured to be used in guiding an object to a target, the system comprising a component configured to calculate said guidance data using a parallel navigation guidance law and a term determined based on a Lyapunov method.

20. The system of claim 19, wherein said term is selected from the group consisting of: a) a first term; b) a second term; c) a third term; d) a summation of two of said first term, said second term, and said third term; and e) a summation of said first term, said second term, and said third term, wherein said first term increases effectiveness of controlling said object's movement to said target for relatively large LOS rates than if said first term were zero, said second term works as a shaping component, influences missile terminal velocity, and requires the measurement of the closing velocity and an estimate of its derivative, and said third term depends on a target acceleration or its estimate.

21. The system of claim 19, wherein said term comprises one of: a) a first term; b) a second term; c) a third term; d) a summation of two of said first term, said second term, and said third term; and e) a summation of said first term, said second term, and said third term, wherein said first term is characterizable by the following expression $$u_{s1}(t) = N_{1s}\dot{\lambda}_s^3(t),\ N_{1s} > 0,$$

said second term is characterizable by the following expression:

$$u_{s2}(t) = N_{2s}\lambda_s(t)\ddot{r}(t),\ \text{where}\ N_{2s}\ \begin{matrix}\geq 1 \\ \leq 1\end{matrix}\ \text{if sign}\left(\ddot{r}(t)\dot{\lambda}_s(t)\lambda_s(t)\right)\ \begin{matrix}\leq 0 \\ \geq 0\end{matrix},\ \text{and}$$

said third term is characterizable by the following expression:

$$u_{s3}(t) = N_{3s}a_{Ts}(t),\ \text{where}\ N_{3s}\ \begin{matrix}\leq 1 \\ \geq 1\end{matrix}\ \text{if sign}\left(a_{Ts}(t)\dot{\lambda}_s(t)\right)\ \begin{matrix}\leq 0 \\ \geq 0\end{matrix}.$$

22. The system of claim 19, wherein said term comprises one or more terms selected from the group consisting of: a) a first term; b) a second term; and c) a third term, wherein said first term is characterizable by the following expression:

$$u_{s1}(t) = N_{1s}\dot{\lambda}_s^3(t),\ N_{1s} > 0,$$

said second term is characterizable by the following expression:

$$u_{s2}(t) = N_{2s}\lambda_s(t)\ddot{r}(t),\ \text{where}\ N_{2s}\ \begin{matrix}\geq 1 \\ \leq 1\end{matrix}\ \text{if sign}\left(\ddot{r}(t)\dot{\lambda}_s(t)\lambda_s(t)\right)\ \begin{matrix}\leq 0 \\ \geq 0\end{matrix},\ \text{and}$$

said third term is characterizable by the following expression:

$$u_{s3}(t) = N_{3s}a_{Ts}(t),\ \text{where}\ N_{3s}\ \begin{matrix}\leq 1 \\ \geq 1\end{matrix}\ \text{if sign}\left(a_{Ts}(t)\dot{\lambda}_s(t)\right)\ \begin{matrix}\leq 0 \\ \geq 0\end{matrix}.$$

23. The system of claim 19, wherein said component is configured to calculate said guidance data is located remote from said object.

24. A system for guiding an object to a target, the system comprising:

a component configured to provide a control signal, said control signal being based on guidance data and being configured to control said object's movement to said target, said guidance data being calculated using a guidance law having one or more terms determined based on a Lyapunov method;

wherein said one or more terms comprise:

a) a first term;

b) a second term;

c) a third term;

d) a summation of two of said first term, said second term, and said third term; and e) a summation of said first term, said second term, and said third term; and wherein said first term increases effectiveness of controlling said object's movement to said target for relatively large LOS rates than if said first term were zero, said second term works as a shaping component, influences missile terminal velocity, and requires the measurement of the closing velocity and an estimate of its derivative, and said third term depends on a target acceleration or its estimate.

25. The system of claim 24, wherein said first term is characterizable by the following expression:

$$u_{s1}(t) = N_{1s}\dot{\lambda}_s^3(t),\ N_{s1} > 0,$$

said first term is characterizable by the following expression:

$$u_{s2}(t) = N_{2s}\lambda_s(t)\ddot{r}(t),$$

$$\text{where}\ N_{2s}\ \begin{matrix}\geq 1 \\ \leq 1\end{matrix}\ \text{if sign}\left(\ddot{r}(t)\dot{\lambda}_s(t)\lambda_s(t)\right)\ \begin{matrix}\leq 0 \\ \geq 0\end{matrix},\ \text{and}$$

said second term is characterizable by the following expression:

$$u_{s3}(t) = N_{3s}a_{Ts}(t),\ \text{where}\ N_{3s}\ \begin{matrix}\leq 1 \\ \geq 1\end{matrix}\ \text{if sign}\left(a_{Ts}(t)\dot{\lambda}_s(t)\right)\ \begin{matrix}\leq 0 \\ \geq 0\end{matrix}.$$

26. The system of claim 24, wherein said first term is characterizable by the following expression:

$$u_{s1}(t) = N_{1s}\dot{\lambda}_s^3(t),\ N_{1s} > 0,$$

said second term is characterizable by the following expression:

$$u_{s2}(t) = N_{2s}\lambda_s(t)\ddot{r}(t),$$

$$\text{where}\ N_{2s}\ \begin{matrix}\geq 1 \\ \leq 1\end{matrix}\ \text{if sign}\left(\ddot{r}(t)\dot{\lambda}_s(t)\lambda_s(t)\right)\ \begin{matrix}\leq 0 \\ \geq 0\end{matrix},\ \text{and}$$

said third term is characterizable by the following expression:

$$u_{s3}(t) = N_{3s}a_{Ts}(t), \text{ where } N_{3s} \begin{matrix} \leq 1 \\ \geq 1 \end{matrix} \text{ if sign}\left(a_{Ts}(t)\dot{\lambda}_s(t)\right) \begin{matrix} \leq 0 \\ \geq 0 \end{matrix}.$$

27. The system of claim 24, wherein said component configured to provide said control signal is located remote from said object.

28. The system of claim 24, wherein said one or more terms provide better miss distance accuracy than using the PRONAV law without said term.

29. A computer-readable method comprising a set of instructions which when executed perform a method for guiding an object, the method comprising controlling said object's movement using a guidance law, said guidance law comprising a parallel navigation guidance law having one or more terms determined based on a Lyapunov method, for improving the accuracy of guidance relative to a PRONAV guidance law.

30. The computer-readable medium of claim 29, wherein said one or more terms being characterizable by the term $u_{s1}(t)=N_{1s}\dot{\lambda}_s^3(t)$ ($N_{1s}>0$) for increasing the effectiveness of said PRONAV guidance law for large line of sight (LOS) rates and has a small effect for small line of sight (LOS) rates.

31. The computer-readable medium of claim 29, wherein the computer-readable medium further comprises:
   calculating a closing velocity for said object; and
   estimating a derivative of said closing velocity, said term comprises a shaping component for influencing the terminal velocity of said object, said shaping component being characterizable by the term $$u_{s2}(t) = N_{2s}\lambda_s(t)\ddot{r}(t)$$

$$\text{where } N_{2s} \begin{matrix} \geq 1 \\ \leq 1 \end{matrix} \text{ if sign}\left(\ddot{r}(t)\dot{\lambda}_s(t)\lambda_s(t)\right) \begin{matrix} \leq 0 \\ \geq 0 \end{matrix}.$$

32. The computer-readable medium of claim 29, further comprising said one or more terms being sensitive to sign ($a_{Ts}(t)\dot{\lambda}_s(t)$) for increasing the effectiveness of said guidance law and being characterizable by the term $$u_{s3}(t) = N_{3s}a_{Ts}(t) \text{ where } N_{3s} \begin{matrix} \leq 1 \\ \geq 1 \end{matrix} \text{ if sign}\left(a_{Ts}(t)\dot{\lambda}_s(t)\right) \begin{matrix} \leq 0 \\ \geq 0 \end{matrix}.$$

33. A method for guiding an object toward a target comprising:
   identifying control parameters of the object and the target;
   determining a parallel navigation guidance algorithm based on the identified control parameters and a Lyapunov method; and
   guiding the object toward the target based on the algorithm.

34. The control method of claim 33, wherein the step of identifying includes:
   determining a closing velocity between the object and the target; and
   determining a derivative of the calculated closing velocity between the object and the target.

35. The control method of claim 33, wherein the step of identifying includes determining an acceleration of the target.

36. A method for guiding the object to the target comprising:
   estimating guidance law parameters including a line-of-sight rate;
   determining a guidance algorithm based on a cube of the estimated line of sight rate; and
   guiding the object toward the target based on the guidance algorithm.

37. A method for guiding the object to the target comprising:
   estimating guidance law parameters including a derivative of the closing velocity;
   determining a guidance algorithm based on the estimated derivative of the closing velocity; and
   guiding the object toward the target based on the guidance algorithm.

38. A method for guiding the object to the target comprising:
   estimating guidance law parameters including a line-of-sight rate and a target acceleration;
   determining a guidance algorithm based on a time-varying coefficient dependent upon the estimated target acceleration and the estimated line-of-sight rate; and
   guiding the object toward the target based on the guidance algorithm.

* * * * *

UNITED STATES PATENT AND TRADEMARK OFFICE
CERTIFICATE OF CORRECTION

PATENT NO. : 7,185,844 B2  
APPLICATION NO. : 10/834830  
DATED : March 6, 2007  
INVENTOR(S) : Rafael T. Yanushevsky It is certified that error appears in the above-identified patent and that said Letters Patent is hereby corrected as shown below:

In claim 2, column 10, line 37, "$u_{s1}(t) = N_{1s}\dot{\lambda}_3^s(t),$" should read -- $u_{s1}(t) = N_{1s}\dot{\lambda}_s^3(t),$ --.

In claim 3, column 10, line 51, "$sign\left(\ddot{r}(t)\dot{\lambda}_s(t)\right)$" should read -- $sign\left(\ddot{r}(t)\dot{\lambda}_s(t)\lambda_s(t)\right)$ --.

In claim 5, column 11, line 6, "$u_{sl}(t) = N_{1s}\dot{\lambda}_s^3(t),$" should read -- $u_{s1}(t) = N_{1s}\dot{\lambda}_s^3(t),$ --.

In claim 5, column 11, line 7, after "$u_{s2}(t) = N_{2s}\lambda_s(t)\ddot{r}(t)$", insert a comma.

In claim 5, column 11, line 11, after "$u_{s3}(t) = N_{3s}a_{Ts}(t)$", insert a comma.

In claim 7, column 11, line 27, "$u_{s2}(t) = N_{s2}\lambda_s(t)\ddot{r}(t)$" should read -- $u_{s2}(t) = N_{2s}\lambda_s(t)\ddot{r}(t)$ --.

In claim 25, column 14, line 32, "$N_{s1} > 0,$" should read -- $N_{1s} > 0,$ --.

In claim 25, column 14, line 34, "said first term" should read --said second term--.

In claim 25, column 14, line 43, "said second term" should read --said third term--.

Signed and Sealed this

Sixteenth Day of October, 2007

JON W. DUDAS  
*Director of the United States Patent and Trademark Office*